United States Patent [19]

Keller et al.

[11] 3,878,291
[45] Apr. 15, 1975

[54] PROCESS FOR THE PRODUCTION OF METAL FREE CHLOROSILANE BY THE CHLORINATION OR HYDROCHLORINATION OF FERROSILICON

[75] Inventors: Rudolf Keller, Ziegelhausen Uber Heidelberg; Hans Klebe; Heinz-Rudiger Vollbrecht, both of Rheinfelden, all of Germany

[73] Assignee: Deutsche Gold- und Silber-Scheideanstalt vormals Roessler, Frankfurt am Main, Germany

[22] Filed: Oct. 4, 1972

[21] Appl. No.: 294,924

[30] Foreign Application Priority Data
Dec. 11, 1971 Germany.......................... 2161641

[52] U.S. Cl. ................ 423/341; 423/343; 423/481; 423/488; 423/492; 423/493; 423/495
[51] Int. Cl. ..... C01b 33/08; C01f 7/56; C01g 49/10
[58] Field of Search .......... 423/343, 342, 341, 492, 423/493, 495, 481; 55/72

[56] References Cited
UNITED STATES PATENTS

| | | | |
|---|---|---|---|
| 2,594,370 | 4/1952 | Warburton.......................... | 423/343 |
| 2,718,279 | 9/1955 | Kraus...................................... | 55/72 |
| 2,849,083 | 8/1958 | Nelson et al............................ | 55/72 |
| 3,188,178 | 6/1965 | Arkless et al......................... | 423/343 |
| 3,257,777 | 6/1966 | Weisse.................................... | 55/72 |
| 3,475,139 | 10/1969 | Schwarz et al....................... | 423/492 |
| 3,578,401 | 5/1971 | Ueberle et al....................... | 423/481 |

Primary Examiner—Oscar R. Vertiz
Assistant Examiner—Brian E. Hearn
Attorney, Agent, or Firm—Cushman, Darby & Cushman

[57] ABSTRACT

Iron, aluminium and titanium free silicon tetrachloride or a mixture thereof with silicochloroform and/or dichlorosilane is prepared by the continuous reaction of lumpy ferrosilicon with chlorine or hydrogen chloride in a closed reactor which has a support for the ferrosilicon as well as means for supplying the halogenation agent in its lower portion and has a ferrosilicon supply and reaction gas exit in its upper portion. The temperature in the top space of the reactor is held below the sublimation temperature of ferric chloride by spraying in liquid chlorosilane and the reaction gas, in a given case by way of a cyclone, is supplied to a washer pressurized with liquid chlorosilane; the mixture of gas, liquid and solid leaving this washer is introduced directly into a separator for liquid and solid laden with liquid chlorosilane, the separated gas lead through a washing column pressurized with pure chlorosilane and finally pure chlorosilane is condensed out.

15 Claims, 1 Drawing Figure

PATENTED APR 15 1975
3,878,291
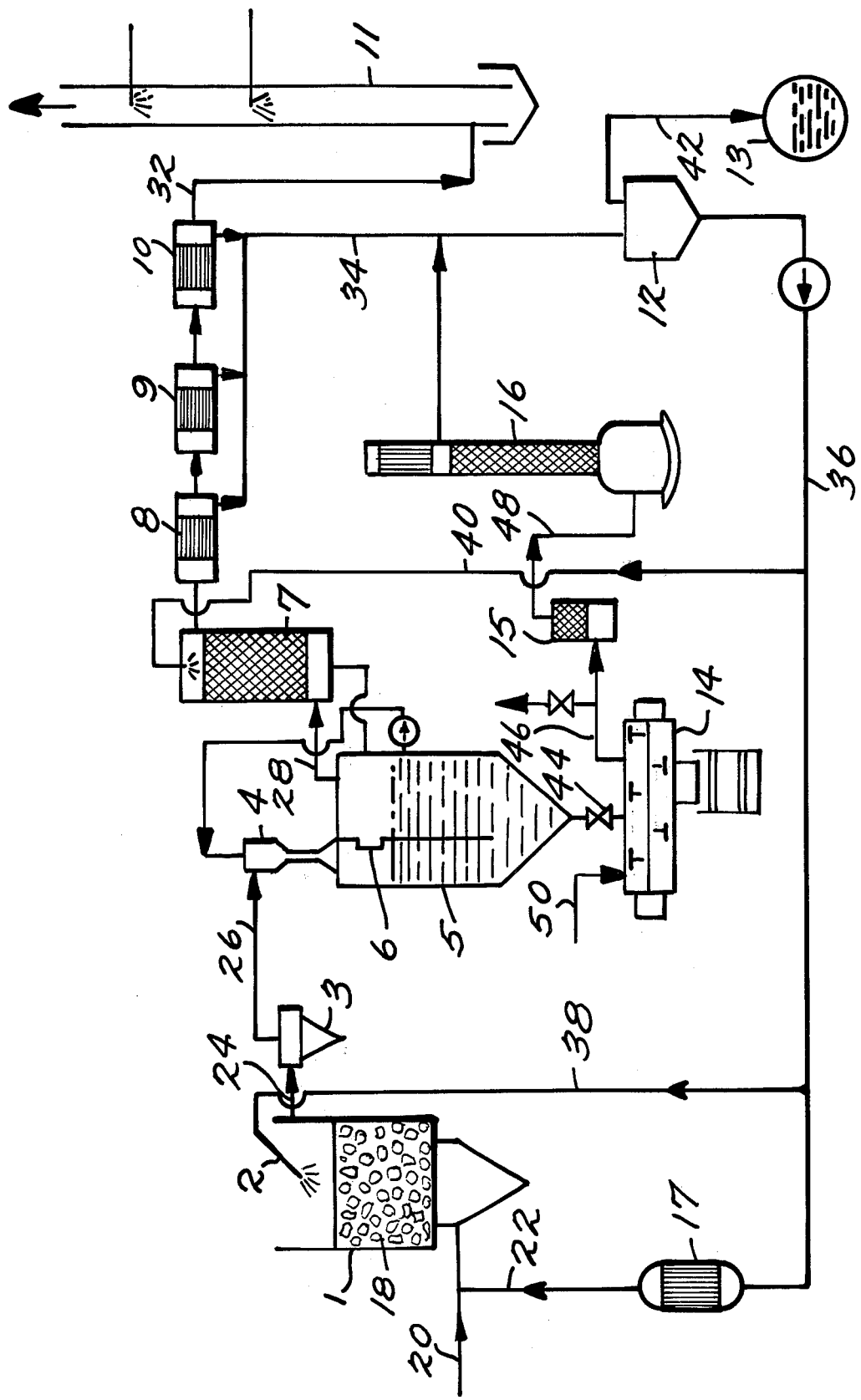

PROCESS FOR THE PRODUCTION OF METAL FREE CHLOROSILANE BY THE CHLORINATION OR HYDROCHLORINATION OF FERROSILICON

The present invention is concerned with a process for the production of an iron, aluminum and titanium free silicon tetrachloride or a mixture of silicon tetrachloride and silicochloroform, as well as in a given case dichlorosilane by the continuous reaction of lumpy ferrosilicon with chlorine or hydrogen chloride in a closed reactor which has a support for the ferrosilicon and an inlet for the halogenation agent in its lower portion and has a ferrosilicon inlet and reaction gas exit in its upper part. As used hereinafter the term chlorosilane is used in short for the silicon tetrachloride or its mixture with silicochloroform and in a given case dichlorosilane.

Commercial ferrosilicon normally contains in addition to 89 to 91 percent by weight of silicon and 6 to 7% by weight of iron, 2 to 3 weight % aluminum and up to about 0.03 percent by weight of titanium. In the chlorination with chlorine or hydrogen chloride therefore in addition to $SiCl_4$ or a $SiCl_4/SiHCl_3/SiH_2Cl_2$ mixture there are present volatile chlorides of the named metals which are disturbing in the process and contaminate the end product.

A previously customary process for the production of the corresponding halosilanes provides for subliming out the iron chloride as a solid by cooling the reaction gases in a heat exchanger connected at the exit of the reactor and separating in cyclones. The gaseous reaction product leaving the cyclones was then led over a reaction tower charged with NaCl in order to separate the aluminum chloride present in the form of the complex compound $Na[AlCl_4]$.

This method of operation leads to satisfactory results provided that the velocity of flow of the reaction gases does not increase over average values and the separation of the flue dust in the cyclone functions unobjectionably. At higher velocities, however, it becomes evident that the heat exchanger and salt tower must be oversized in order to improve the removal of iron chloride and aluminum chloride. A further difficulty is that it was unavoidable in this process in longer operation of the salt tower to prevent coating of the surface of the sodium chloride by the entrained solid particles, especially ferrosilicon and iron chloride whereby the reactivity of aluminum chloride is impaired. As a consequence thereof there occurs in the apparatus parts, connected to the exit of the salt tower, frequent cloggings through sublimation of aluminum chloride which renders the operation of the plant susceptible to interruption. Additionally the $TiCl_4$ contained in the reaction gas, in an amount of about 1/10th that of the aluminum chloride, must be separated by fractional distillation of the entire chlorosilanes recovered in the process.

Finally it has been tried to delay the escape of the sublimable iron salts from the reactor by reducing the gas exit temperature from the reactor from the customary 700°C. while mixing the gaseous chlorinating agent flowing into the reactor with the chlorosilane hydrogen mixture arising from the process. The necessary return gas mixture necessary for the production of a sufficient reduction in temperature must, however, amount to a considerable part of the chlorosilane produced in the process which, apart from more important disturbance susceptibilities, leads to still greater dimensioning of the individual apparatus.

The present invention therefore is based on the problem of developing a process for the production of the chlorosilanes $SiCl_4$, $SiHCl_3$ and $SiH_2Cl_2$ by the chlorination or hydrochlorination of ferrosilicon in which there can be substantially completely attained the separation of the iron, aluminum and titanium chlorides from the halosilanes formed.

This problem has been solved according to the invention by the continuous reaction of lumpy ferrosilicon with chlorine or hydrogen chloride in a closed reactor which is provided in its lower portion with a support for the ferrosilicon as well as an inlet for the halogenation agent and in its upper portion is provided with a ferrosilicon inlet and a reaction gas exit; the temperature in the top space of the reactor is held below the sublimation temperature of ferric chloride by spraying in liquid chlorosilane and the reaction gas, in a given case via a cyclone, is supplied to a washer pressurized with liquid chlorosilane; the mixture of gas, liquid and solid leaving this washer is introduced directly into a separator for liquid and solid, said separator being laden with liquid chlorosilane, the separated gas lead through a washing column pressurized with pure chlorosilane and finally pure chlorosilane is condensed out.

By mixing the overheated chlorosilane vapors with the halogenation agent before introduction into the reactor the resulting cooling effect protects the support for the ferrosilicon. Besides in adiabatic operation of the reactor there does not occur a melting of the ferrosilicon.

By injecting liquid reaction product into the top space of the reactor (quenching) the temperature in the gas phase is held below 672°C., e.g. 200° to 600° C., preferably between 250° and 500°C. As a result the iron chloride is in a solid form separable from the admixed reaction gas and can be separated, for example in after connected centrifuged separators.

There is best employed for both cooling purposes returned chlorosilane, preferably already purified chlorosilane.

Aluminum chloride and titanium tetrachloride besides small amounts of iron chloride and FeSi or ashes — flying dust are condensed out in the washer pressurized with liquid halosilanes by cooling the gaseous mixture to about 56°C. An especially effective scrubbing of both disturbing impurities is produced if there is used as the washer a venturi washer which is fed with liquid chlorosilane. The venturi washer communicates directly with the separator for liquids and solids.

It has also proven suitable to choose a vessel for the separator, which has besides a conical sump a sidewise arranged dip tube terminating half way up, which is connected by its upper opening to the exit of the venturi washer and below the named opening has a gas exit. Preferably the liquid chlorosilane is placed in the separator on a constant level lying below the gas separation range. This means that the chlorosilane surface is held below the specified exit opening but above the lower mouth of the dip tube while there is fed liquid chlorosilane to the venture washer from the separator, preferably from the separator sump, and therewith the liquid chlorosilane used for washing is recycled.

The top portion of the separator connected with the gas exit of the dip tube is connected with a washing column through which returned pure chlorosilane can be led countercurrently. While the main part of the aluminum chloride and the titanium tetrachloride are thus precipitated in the separator in solid or liquid form and $AlCl_3$ collected as solid in the separator sump, a fine purification of the gaseous chlorosilane takes place in the washing column, chiefly from titanium IV chloride. The purified chlorosilane is then led through a condenser chain and condensed. The condensation of $SiCl_4$ or $SiCl_4/SiHCl_3/SiH_2Cl_2$ mixture takes place suitably in three steps, namely at 25°C., − 20°C. and −70°C. The hydrogen formed as a byproduct in the reaction of ferrosilicon with hydrogen chloride is drawn off at the end of the condenser chain and can be utilized after a washing with water and a subsequent washing with soda lye. The condensed reaction product is then collected in a pump receiver. This is connected in a given case via a line with a spray nozzle arranged in the top space of the reactor. In case a return of the chlorosilane vapor into the reactor is planned the chlorosilane is led from the pump receiver to a vaporization apparatus which produces the necessary "return gas."

The slurry deposited in the separator contains besides aluminum chloride, iron chloride and FeSi-dust chlorosilane with titanium IV chloride dissolved therein. According to a preferred form of the process of the invention the sediment is partially drawn off from the sump of the separator, drives out the chlorosilane and titanium IV chloride contained therein over a tower filled with alkali halide and preferably heated to at least 180°C. and separates the volatiles, in a given case after condensation, finally by distillation. The temperature in the tower can be from 40° to 70° C.

The distillation residue obtained then is subjected to hydrolysis with steam and the hydrogen chloride set free is converted into hydrochloric acid in an absorption column having water flowing therein. The hydrolysis residue after evaporation can be brought to dryness.

According to a large scale usable process variant the sediment from the separator sump is introduced into a heatable shovel dryer depending on the direction of revolution rotating or discharging and provided with sediment inlet, vapor supply and gas or liquid outlet, then the chlorosilane and titanium IV chloride expelled with rotation over an alkali halide tower (e.g. filled with sodium chloride or potassium chloride), connected hereto the steam treatment with production of hydrochloric acid and finally discharges the dried hydrolysis residue by reversing the shovel drier axle.

The process conditions just explained result in a continuous process for the feeding of ferrosilicon and hydrogen chloride or chlorine as well as discharge of pure chlorosilane, hydrogen (when HCl is the chlorinating agent), titanium IV chloride, hydrochloric acid and preponderantly aluminum, iron and silicon compound containing solids.

The following means of action have a substantial and independent significant meaning within the scope of the invention:

1. The spraying in of return chlorosilane into the top space of the reactor.

2. The use of a washer-separator arrangement for separation of iron chloride, aluminum chloride, titanium tetrachloride and FeSi or ash-flue dust from the reaction gas.

3. The treatment of the distillation residue of the sediment from the separator with steam after preceding expelling of chlorosilane and titanium IV chloride over an alkali halide tower and the apparatus measures provided therefore.

The single FIGURE of the drawing is a schematic representation of the apparatus for carrying out the process of the invention.

The invention will be further illustrated by the following example which shows a preferred method of carrying out the overall process in combination with the drawing.

EXAMPLE 1

In the closed reactor 1 charged with about 3 metric tons of lumpy ferrosilicon 18 (90% Si) there were introduced 200 $Nm^3/h$ of hydrogen chloride through conduit 20 and 300 kg/h of chlorosilane vapor (predominantly $SiCl_4$ but also containing $SiHCl_3$ and $SiH_2Cl_2$), through conduit 22.

By the admixture of the gaseous chlorosilane mixture overheated to about 180°C. with the hydrogen chloride reactant there is avoided the sintering of the FeSi bed conditioned by the high temperatures (about 1,300°C.) which makes possible the continuous operation of the reactor 1. A periodic removal of slag from the reactor can thereby be dropped. The chlorination residue was continuously discharged through a vibrating grate developed as a support for the FeSi. The gas stream passes through a nearly equally level ferrosilicon charge about 1.50 meters high and thereby reacts to form a chlorosilane mixture. To remove the heat content from the reaction gases leaving the FeSi charge and to sublimate out the gaseous iron chloride there were sprayed into the top portion of the reactor from conduit 2 about 1,200 kg/h of liquid recycled pure chlorosilane mixture. With use of the vaporization and superheating heat of the quenching liquid the reaction gases are cooled to about 280°C. This is for below the sublimation temperature of iron chloride.

The gas stream from the reactor which consists essentially of the cooling gas, silicon tetrachloride, trichlorosilane and traces of dichlorosilane, hydrogen and aluminum chloride, titanium tetrachloride and iron chloride passes via conduit 24 to cyclone 3 to separate the flue dust as well as the greatest part of the iron chloride. Thereby there is separated about 8 kg/h of flue dust. The separation of the flue dust in cyclone 3 is of advantage in so far as thereby there is reduced the accumulation of solids in solid separator 5 and the working up of the slurry in apparatus 14, 15 and 16 is relieved.

To further purify the gaseous reaction products the hot gas mixture at about 250°C. is lead via conduit 26 to venturi washer 4 which is pressurized with about 10 $m^3/h$ of recycling silicon tetrachloride from the solids separator 5 clarified of solids. In the venturi washer 4 the Raschig mixture for the most part is cooled to about 53°C. by partial vaporization of the recycling liquid silicon tetrachloride. Thereby the entire aluminum chloride is condensed and likewise the traces of iron chloride still present washed down with excess recycling fluid into the solids separator 5. Titanium tetrachloride, because of the cooling in the venturi washer 4, is simultaneously condensed and mixed with recycling liquid. The gaseous mixture which leaves the solids separator 5 by the gas outlet opening above the surface of the recycling fluid of separator tube 6 goes by conduit 28 to the Rasching ring filled washing column 7 for the fine purification of the titanium tetrachloride before the condensers 8, 9 and 10. Thereby so much recycled, purified chlorosilane mixture is delivered to the washing column via conduit 40 as washing liquid is vaporized in the venturi washer 4 in the gas washing of the silicon tetrachloride and is withdrawn in the subsequent periodical withdrawal of slurry from solids separator 5. The solids separator 5 is thus maintained at a constant liquid level. The method of operation according to this process has the advantage over conventional processes of not requiring a distillation of the total chlorosilane formed in the reaction for the production of the desired degree of purity. Only the small silicon tetrachloride content of the slurry from the solids separator based on the entire product must be worked up by distillation.

The chlorosilane purified from the undesired metal compounds is condensed in the condensers 8, 9 and 10 at temperatures between +20°C. and −50°C. The hydrogen (100 Nm³/h) leaving the condensers is fed via conduit 32 to a water washer 11 and after leaving the top of the washer after drying can be otherwise further used.

The condensate from the condensers 8, 9, 10 next goes by conduit 34 to the pump receiver 12. A portion of the condensate is delivered from here via conduits 36, 38 and 40 for cooling and washing purposes back into the plant at condenser 17, inlet 2 and column 7 while the pure chlorosilane produced (345 kg/h silicon tetrachloride-trichlorosilane mixture) with a small content of dichlorosilane (analysis 83% $SiCl_4$, 16.8% $SiHCl_3$ and 0.2% $SiH_2Cl_2$) goes by overflowing through conduit 42 to storage tank 13.

In the solids separator 5 the solid aluminum chloride, iron chloride as well as FeSi dust and ashes settle in the cone of the separator. From here about 25 l/h of solid-liquid mixture (the latter consisting of $SiCl_4$ and $TiCl_4$) periodically are drawn off through valve 44 into the paddle dryer 14 and about 20 l/h of the mixture of silicon tetrachloride and titanium tetrachloride is separated from the solids. Then the silicon tetrachloride—titanium tetrachloride passes via conduit 46 to heated tower 15 (180°C.) filled with sodium chloride to separate from the gas stream entrained aluminum chloride in the form of the complex compound, sodium aluminum chloride, $Na[AlCl_4]$. The separated silicon tetrachloride-titanium tetrachloride mixture is condensed and goes via conduit 48 to column 16 where it is subjected to a fractional distillation. Thereby the silicon tetrachloride is expelled at the top and titanium tetrachloride is drawn off from the sump.

While retaining the direction of rotation of the paddle dryer 14 after drying off the solids has taken place, steam is blown in through conduit 50 for hydrolysis. The hydrogen chloride set free is absorbed in water and returned to the process (not shown). After hydrolysis and drying take place, the hydrolysis product is discharged by reversing the direction of rotation of the paddle dryer 14.

Unless otherwise indicated all parts and percentages are by weight.

What is claimed is:

1. A process for the production (1) silicon tetrachloride, (2) a mixture of silicon tetrachloride with a minor amount of silicochloroform, or (3) a mixture of silicon tetrachloride with a minor amount of both silicochloroform and dichlorosilane free of iron, aluminum and titanium which comprises reacting lumpy ferrosilicon with chlorine or hydrogen chloride as the chlorinating agent in a closed reactor which in its lower portion has support means for the ferrosilicon and a chlorinating agent inlet and its upper portion a ferrosilicon inlet and a reaction gas outlet, holding the temperature in the top space of the reactor below the sublimation temperature of iron chloride by spraying in pure liquid chlorosilane and sending the reaction gas through said reaction gas outlet in the upper portion of the reactor to a washer pressurized with liquid chlorosilane, conducting a mixture of gas, liquid and solids leaving the washer directly to a separator for the liquid and solids charged with liquid chlorosilane, separating the liquid and solids therein, leading the separated gas through a washing column pressurized with pure chlorosilane and finally condensing pure chlorosilane.

2. A process according to claim 1 wherein the reaction gases from the reactor are sent to a cyclone to remove solids therefrom.

3. A process according to claim 1 wherein the chlorosilane sprayed into the top space of the reactor is pure chlorosilane returned from another portion of the process.

4. A process according to claim 1 wherein the liquid chlorosilane is maintained at a constant level below the region of gas separation.

5. A process according to claim 1 wherein the washer is supplied with liquid chlorosilane from the separator.

6. A process according to claim 5 wherein the washing column is pressurized with recycled pure chlorosilane.

7. A process according to claim 1 wherein the separator has a sump and at intervals sediment is removed from the sump of the separator, chlorosilane and titanium IV chloride therein are driven out over a heated column filled with alkali halide and volatiles from said column are separated by a final distillation.

8. A process according to claim 7 wherein the alkali halide is alkali chloride, the column is heated to at least 180°C.

9. A process according to claim 8 wherein the volatiles are condensed prior to said final distillation.

10. A process according to claim 7 wherein the residue in the separator is treated with steam to hydrolyze the same and the hydrogen chloride set free is scrubbed with water in an absorption column to convert it to hydrochloric acid.

11. A process according to claim 10 wherein the hydrolysis residue is evaporated to dryness.

12. A process according to claim 7 wherein the sediment from the sump of the separator is passed to a heated, rotating paddle dryer provided with a sediment inlet, vapor supply line and fluid outlet, the chlorosilane and titanium IV chloride are expelled therefrom and sent to an alkali halide tower and then the residue in the dryer hydrolyzed with steam to produce hydrochloric acid, the hydrolysis residue dried, the direction of rotation of the dryer reversed and the residue discharged from the drier.

13. A process according to claim 1 wherein the lumpy ferrosilicon is reacted with hydrogen chloride.

14. A process according to claim 1 wherein the lumpy ferrosilicon is reacted with chlorine.

15. A process according to claim 1 wherein purified chlorosilane is (1) returned to the reactor to quench the temperature in the top space thereof, (2) is returned to a washing column for gases leaving the solids separator and (3) is returned to the reactor below the ferrosilicon together with chlorine or hydrochloric acid.

* * * * *